United States Patent
Granger et al.

(10) Patent No.: US 12,496,667 B2
(45) Date of Patent: Dec. 16, 2025

(54) WRENCH SYSTEMS, METHODS, AND RELATED APPARATUS FOR DETERMINING ANGULAR MISALIGNMENT

(71) Applicant: FORUM US, INC., Houston, TX (US)

(72) Inventors: Jeremy S. Granger, Crowley, LA (US); Mithun Singla, Richmond, TX (US); Juan Arbelaez, Houston, TX (US)

(73) Assignee: FORUM US, INC., Houston, TX (US)

( * ) Notice: Subject to any disclaimer, the term of this patent is extended or adjusted under 35 U.S.C. 154(b) by 373 days.

(21) Appl. No.: 18/168,823

(22) Filed: Feb. 14, 2023

(65) Prior Publication Data

US 2024/0269787 A1    Aug. 15, 2024

(51) Int. Cl.
*B23P 19/06* (2006.01)
*E21B 19/16* (2006.01)

(52) U.S. Cl.
CPC .......... *B23P 19/061* (2013.01); *E21B 19/163* (2013.01); *E21B 19/165* (2013.01)

(58) Field of Classification Search
CPC ....... B25B 13/46; B25B 13/467; B25B 13/48; B25B 13/481; B25B 13/486; B25B 13/488; B25B 13/50; B25B 13/5016; B25B 13/5058; B25B 21/00; B23P 19/027; B23P 19/04; B23P 19/06; B23P 19/061; B23P 19/067; B23P 19/069; B23P 19/10; B23P 19/105; B23P 19/12; E21B 19/02; E21B 19/81; E21B 19/86; E21B 19/16; E21B 19/161; E21B 19/163; E21B 19/165; E21B 19/166
See application file for complete search history.

(56) References Cited

U.S. PATENT DOCUMENTS

| | | |
|---|---|---|
| 7,195,083 B2 | 3/2007 | Eppink et al. |
| 8,281,856 B2 | 10/2012 | Jahn et al. |
| 10,648,254 B2 | 5/2020 | Meuth |
| 10,753,162 B2 | 8/2020 | Vo |
| 10,767,425 B2 | 9/2020 | Meuth et al. |
| 10,808,469 B2 | 10/2020 | Vo |

(Continued)

FOREIGN PATENT DOCUMENTS

| | | |
|---|---|---|
| AU | 2012321094 B2 | 6/2015 |
| AU | 2017200902 A1 | 8/2017 |

(Continued)

*Primary Examiner* — Robert J Scruggs
(74) *Attorney, Agent, or Firm* — Patterson + Sheridan, LLP (57) ABSTRACT

Wrench systems, methods, and related apparatus are used for determining angular misalignment in wrenches that make up and/or break out tubular connections. The systems, methods, and related apparatus are used to continuously monitor for angular misalignment and automatically correct for angular misalignment. A wrench system includes a first clamp assembly, a second clamp assembly, and a positioning subsystem. The positioning subsystem includes one or more sensor tracks mounted to the first clamp assembly, and one or more position sensors mounted to the second clamp assembly. The one or more position sensors are configured to interface with the one or more sensor tracks to measure an angular position of the second clamp assembly relative to the first clamp assembly.

20 Claims, 9 Drawing Sheets

(56) References Cited

U.S. PATENT DOCUMENTS

| | | | |
|---|---|---|---|
| 2009/0126536 A1* | 5/2009 | Begnaud | E21B 19/165 |
| | | | 81/57.44 |
| 2015/0211332 A1 | 7/2015 | Noske et al. | |
| 2017/0266760 A1 | 9/2017 | Linyaev et al. | |
| 2018/0291836 A1 | 10/2018 | Langenfeld et al. | |
| 2019/0003270 A1* | 1/2019 | Clostio, Jr. | E21B 19/16 |

FOREIGN PATENT DOCUMENTS

| | | | |
|---|---|---|---|
| CN | 105308255 A | | 2/2016 |
| CN | 205503052 | * | 8/2016 |

\* cited by examiner

WRENCH SYSTEMS, METHODS, AND RELATED APPARATUS FOR DETERMINING ANGULAR MISALIGNMENT

BACKGROUND

Field

Aspects of the present disclosure relate to wrench systems, methods, and related apparatus for determining angular misalignment in wrenches that are used to make up and/or break out tubular connections. In one or more implementations, the systems, methods, and related apparatus are used to continuously monitor for angular misalignment and automatically correct for angular misalignment.

Description of the Related Art

Wrenches can be misaligned such that a tubular moving into or out of the wrenches collide with an obstruction. Collisions can cause damage that involve operational delays and increased costs. Reducing misalignment can be difficult, inaccurate, time-delaying, and expensive.

Therefore, there is a need for wrench systems, methods, and related apparatus that determine angular misalignment to facilitate reduced collisions in a manner that is simple, accurate, quick, and inexpensive.

SUMMARY

Aspects of the present disclosure relate to wrench systems, methods, and related apparatus for determining angular misalignment in wrenches that are used to make up and/or break out tubular connections. In one or more implementations, the systems, methods, and related apparatus are used to continuously monitor for angular misalignment and automatically correct for angular misalignment.

In one implementation, a wrench system includes a first clamp assembly, a second clamp assembly, and a positioning subsystem. The positioning subsystem includes one or more sensor tracks mounted to the first clamp assembly, and one or more position sensors mounted to the second clamp assembly. The one or more position sensors are configured to interface with the one or more sensor tracks to measure an angular position of the second clamp assembly relative to the first clamp assembly.

In one implementation, a method of adjusting a wrench includes determining a position of one or more position sensors along one or more sensor tracks. The one or more sensor tracks are mounted to a first clamp assembly and the one or more position sensors are mounted to a second clamp assembly. The determining of the position includes determining a linear position of a piston of each of the one or more position sensors. The linear position indicates an angular position of the second clamp assembly relative to the first clamp assembly. The determining of the position includes determining if the linear position is within a threshold position range. The method includes moving the first clamp assembly and the second clamp assembly in relation to a tubular if the linear position is within the threshold position range. The method includes pivoting the second clamp assembly relative to the first clamp assembly if the linear position is outside of the threshold position range.

In one implementation, a non-transitory computer readable medium includes instructions that, when executed, cause a plurality of operations to be conducted. The plurality of operations include determining a position of one or more position sensors along one or more sensor tracks. The determining of the position includes determining a linear position of a piston of each of the one or more position sensors. The linear position indicates an angular position of a second clamp assembly relative to a first clamp assembly. The determining of the position includes determining if the linear position is within a threshold position range. The plurality of operations include moving the first clamp assembly and the second clamp assembly in relation to a tubular if the linear position is within the threshold position range, and pivoting the second clamp assembly relative to the first clamp assembly if the linear position is outside of the threshold position range.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the present disclosure relate to wrench systems, methods, and related apparatus for determining angular misalignment in wrenches that are used to make up and/or break out tubular connections. In one or more implementations, the systems, methods, and related apparatus are used to continuously monitor for angular misalignment and automatically correct for angular misalignment.

The disclosure contemplates that terms such as "couples," "coupling," "couple," and "coupled" may include but are not limited to welding, interference fitting, and/or fastening such as by using bolts, threaded connections, pins, and/or screws. The disclosure contemplates that terms such as "couples," "coupling," "couple," and "coupled" may include but are not limited to integrally forming. The disclosure contemplates that terms such as "couples," "coupling," "couple," and "coupled" may include but are not limited to direct coupling and/or indirect coupling, such as indirect coupling through components such as links.

Figure 1:
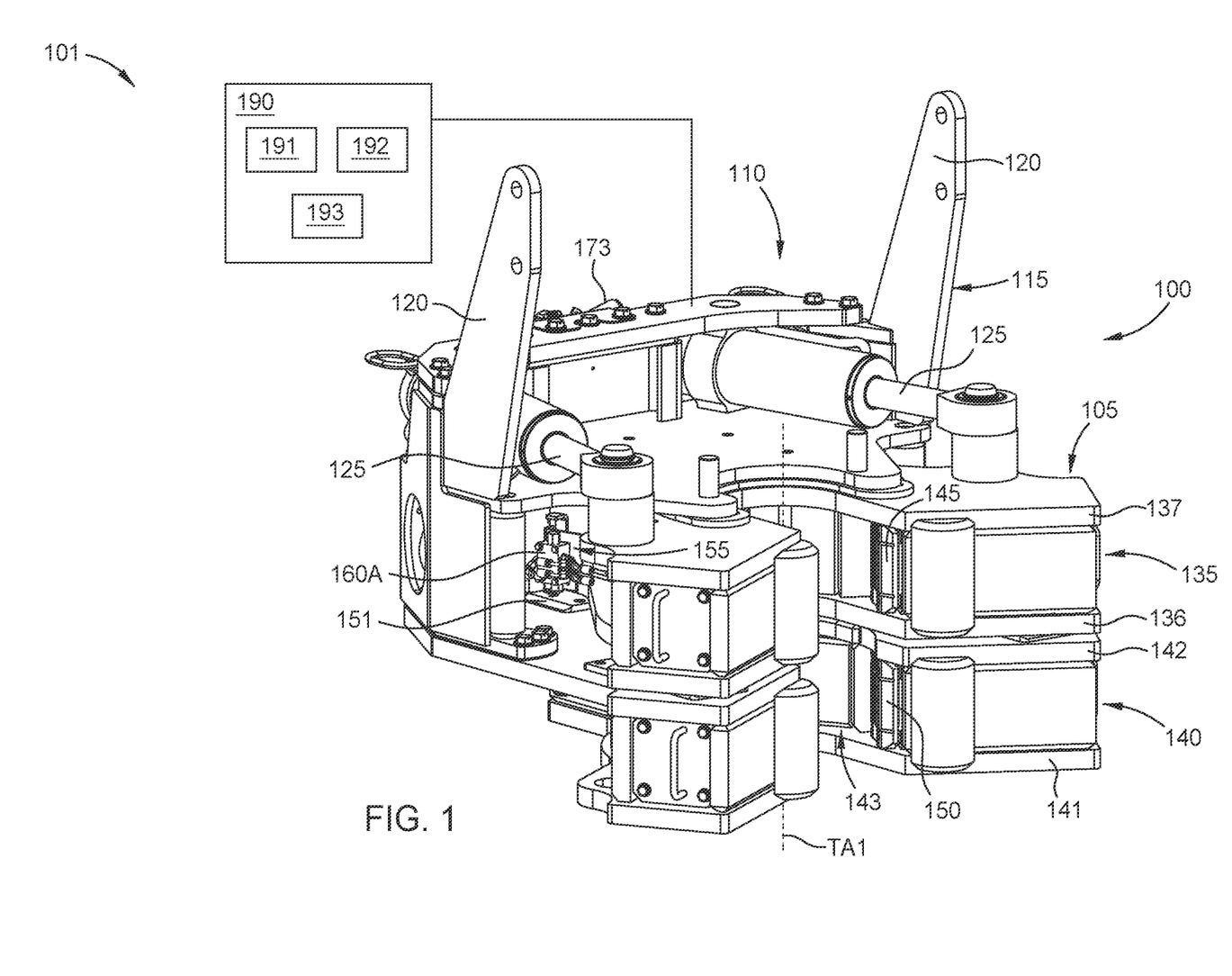
FIG. 1 is a schematic partial perspective front view of a wrench tool, according to one implementation.

FIG. 1 is a schematic partial perspective front view of a wrench tool 100, according to one implementation.

The wrench tool 100 includes a wrench assembly 105 coupled to a support structure 115. The support structure 115 may include hangers 120 for suspending the wrench tool 100. A space 110 may be provided between the hangers 120 for a spinner tool.

The wrench assembly 105 includes a lower clamp assembly 140 (a first clamp assembly) and an upper clamp assembly 135 (a second clamp assembly). The wrench assembly 105 also includes hydraulic cylinders 125 that move the upper clamp assembly 135 relative to the lower clamp assembly 140 about a tool axis TA1. The upper clamp assembly 135 and the lower clamp assembly 140 include a plurality of grip assemblies 145 and 150, respectively (some are shown in FIG. 1). A plurality of first grip assemblies 150 of the lower clamp assembly 140 may be used to grip a box end of a first tubular, and a plurality of second grip assemblies 145 of the upper clamp assembly 135 may be used to grip a pin end of a second tubular to make up (e.g., thread together) the first tubular and the second tubular.

The lower clamp assembly 140 includes two first plates 141, 142 and a lower throat 143 (a first throat) formed in the first plates 141, 142. The upper clamp assembly 135 includes two second plates 136, 137 and an upper throat 138 (a second throat) formed in the second plates 136, 137. The throats 138, 143 are each U-shaped.

The plurality of first grip assemblies 150 are mounted at least partially to each of the first plates 141, 142. The plurality of second grip assemblies 145 are mounted at least partially to each of the second plates 136, 137.

In a make-up operation, the wrench tool 100 is brought into proximity with a first tubular that is held by a rotary spider on a rig floor for example. The wrench tool 100 is moved laterally such that the first tubular is positioned into the throats 138, 143. The first grip assemblies 150 of the lower clamp assembly 140 are actuated to grip the box end of the first tubular. A pin end of a second tubular is positioned on top of the box end of the first tubular, for example by an elevator or top drive (not shown).

The second tubular is rotated by a spinner tool (not shown) to initially make up the threaded connection between the first and second tubulars. After the initial make up, the second grip assemblies 145 of the upper clamp assembly 135 are actuated into contact with the pin end of the second tubular, while the box end of the first tubular remains gripped by the lower clamp assembly 140. The upper clamp assembly 135 then is rotated relative to the lower clamp assembly 140 to further tighten the threads between the first and second tubulars. After the make-up is completed, the wrench tool 100 can be moved laterally such that the first tubular and the second tubular are positioned outside of the throats 138, 143.

When laterally moving the wrench tool 100 such that the throats 138, 143 move relative to a tubular, the tubular can collide with the wrench tool if the upper throat 138 of the upper clamp assembly 135 is angularly misaligned relative to the lower throat 138 of the lower clamp assembly 140. An angular misalignment can result, for example, from the upper clamp assembly 135 being pivoted relative to the lower clamp assembly 140 to complete a make-up operation.

The wrench tool 100 is part of a wrench system 101 that includes a controller 190. The wrench system 101 includes a positioning subsystem 155. The positioning subsystem 155 includes one or more sensor tracks 151 (one is shown in FIG. 1) mounted to the upper plate 142 of the lower clamp assembly 140, and one or more position sensors 160A, 160B (one position sensor 160A is shown in FIG. 1) mounted to the upper clamp assembly 135. The one or more position sensors 160A, 160B are configured to interface with the one or more sensor tracks 151 to measure an angular position of the upper clamp assembly 135 relative to the lower clamp assembly 140. When the upper clamp assembly 135 is angularly misaligned relative to the lower clamp assembly 140, the angular position indicates an angular misalignment between the upper clamp assembly 135 and the lower clamp assembly 140. In one or more embodiments, the angular misalignment is between the upper throat 138 and the lower throat 143.

The controller 190 includes a central processing unit (CPU) 191, a memory 192 containing instructions, and support circuits 193 for the CPU 191. The controller 190 controls various items directly, or via other computers and/or controllers. In one or more embodiments, the controller 190 is communicatively coupled to dedicated controllers, and the controller 190 functions as a central controller.

The controller 190 is of any form of a general-purpose computer processor that is used in an industrial setting for controlling various wrench tools or wrench tool components, and sub-processors thereon or therein. The memory 192, or non-transitory computer readable medium, is one or more of a readily available memory such as random access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)), read only memory (ROM), floppy disk, hard disk, flash drive, or any other form of digital storage, local or remote. The support circuits 193 of the controller 190 are coupled to the CPU 191 for supporting the CPU (a processor). The support circuits 193 include cache, power supplies, clock circuits, input/output circuitry and subsystems, and the like. Operational parameters (such as the angular alignment range) and operations are stored in the memory 192 as a software routine that is executed or invoked to turn the controller 190 into a specific purpose controller to control the operations of the various wrench tools and wrench systems described herein. The controller 190 is configured to conduct any of the operations described herein. The instructions stored on the memory 192, when executed, cause one or more of operations of method 900 (described below) to be conducted.

The various operations described herein (such as the operations of the method 900) can be conducted automatically using the controller 190, or can be conducted automatically and/or manually with certain operations conducted by a user.

The controller 190 is configured to control the wrench tool 100 based on data measured using the one or more position sensors 160A, 160B and/or the one or more pressure sensors 173. The controller 190 includes embedded software and a compensation algorithm to calibrate measurements. The controller 190 can include one or more machine learning algorithms and/or artificial intelligence algorithms that estimate optimized parameters for the wrench operations. The one or more machine learning algorithms and/or artificial intelligence algorithms can use, for example, a regression model (such as a linear regression model) or a clustering technique to estimate optimized parameters. The algorithm can be unsupervised or supervised.

Figure 2:
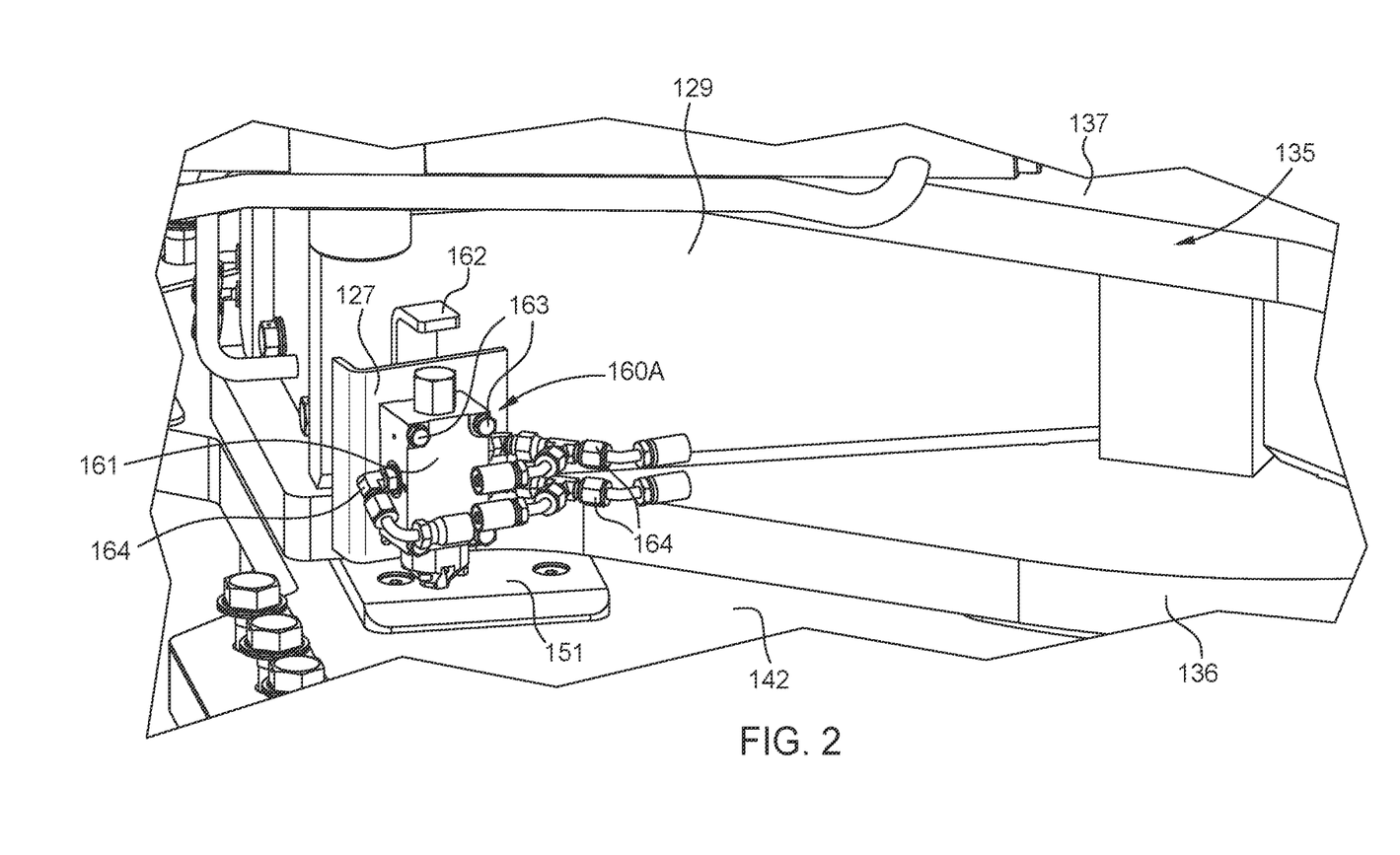
FIG. 2 is a schematic partial side perspective view of a position sensor shown in FIG. 1, according to one implementation.

FIG. 2 is a schematic partial side perspective view of the position sensor 160A shown in FIG. 1, according to one implementation.

Each of the one or more position sensors 160A, 160B includes a sensor housing 161. Each of the one or more position sensors 160A, 160B is coupled to the upper clamp assembly 135 using a clamp flange 127 and a sensor flange 162. A plurality of fasteners 163 fasten the sensor housing 161 to the clamp flange 127. The clamp flange 127 is positioned between the sensor flange 162 and the sensor housing 161. The fasteners 163 extend through the sensor housing 161, through the clamp flange 127, and into the sensor flange 162. The clamp flange 127 is coupled to (e.g., welded to and/or integrally formed with) one or more of a lower second plate 136 and/or a grip housing 129 of the upper clamp assembly 135.

A plurality of conduits 164 are connected to the sensor housing 161. In one or more embodiments, the one or more sensors 160A, 160B are hydraulic and the conduits 164 are hydraulic conduits that supply and return a fluid (such as a hydraulic fluid) to and from the sensor housing 161. The present disclosure contemplates that the conduits 164 can be connected to the same hydraulic fluid source that supplies hydraulic fluid to the grip assemblies 145, 150 and/or the hydraulic cylinders 125. In one or more embodiments, the one or more sensors 160A, 160B are electric and the conduits 164 are electric conduits that supply and return electric power and/or data to and from the sensor housing 161. The one or more sensors 160A, 160B can be referred to as mechanical cam valves.

Figure 3:
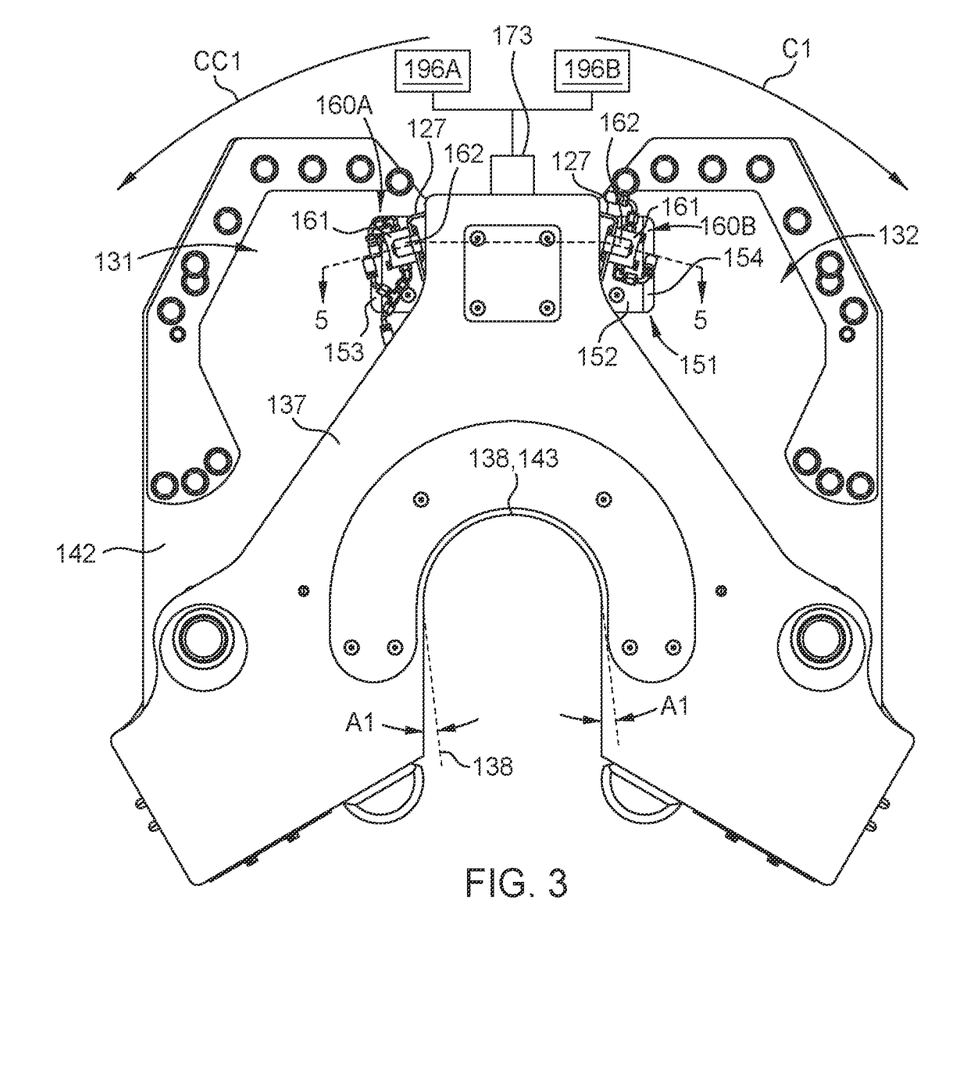
FIG. 3 is a schematic partial top view of the wrench tool and a positioning subsystem shown in FIG. 1, according to one implementation.

FIG. 3 is a schematic partial top view of the wrench tool 100 and the positioning subsystem 155 shown in FIG. 1.

As shown in FIGS. 1 and 3, the upper throat 138 of the upper clamp assembly 135 is angularly aligned with the lower throat 143 of the lower clamp assembly 140. The one or more position sensors 160A, 160B include a first position sensor 160A mounted to a first outward side 131 of the upper clamp assembly 135, and a second position sensor 160B mounted to a second outward side 132 of the upper clamp assembly 135. The one or more sensor tracks 151 are coupled (e.g., fastened) to an upper first plate 142 of the lower clamp assembly 140. In the implementation shown, the one or more sensor tracks 151 include a single sensor track 151 configured to interface with both of the first position sensor 160A and the second position sensor 160B. The present disclosure contemplates that the one or more sensor tracks 151 can include two or more sensor tracks. The single sensor track 151 includes a plateau surface 152, a first surface 153 on a first side of the plateau surface 152, and a second surface 154 on a second side of the plateau surface 152. Each of the first surface 153 and the second surface 154 is tapered or arcuate.

FIG. 3 shows (in ghost) a pivoted position of the upper throat 138 relative to the lower throat 143 after the upper clamp assembly 135 is pivoted in a counter-clockwise direction CC1. The upper throat 138 of the upper clamp assembly 135 pivots by an angle A1 of misalignment relative to the lower throat 143 of the lower clamp assembly 140. In one or more embodiments, the wrench system 101 initiates a correction operation if the angle A1 is outside of an angular misalignment range. The wrench system 101 pivots the upper clamp assembly 135 in the counter-clockwise direction CC1 or a clockwise direction C1 (whichever is shorter) until the angle A1 is within the angular misalignment range.

Figure 4:
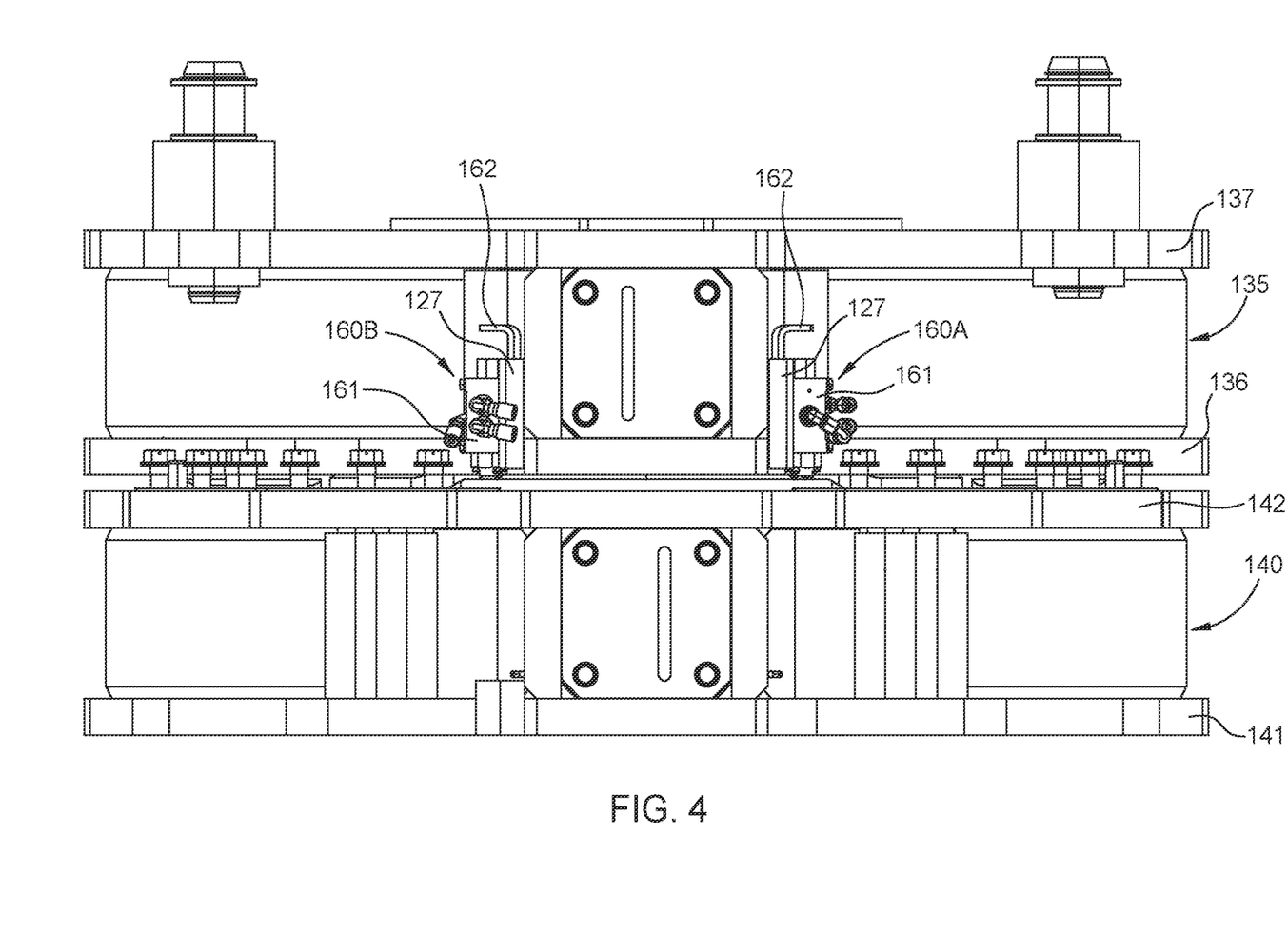
FIG. 4 is a schematic partial back view of the wrench tool and the positioning subsystem shown in FIGS. 1 and 3, according to one implementation.

FIG. 4 is a schematic partial back view of the wrench tool 100 and the positioning subsystem 155 shown in FIGS. 1 and 3.

Figure 5:
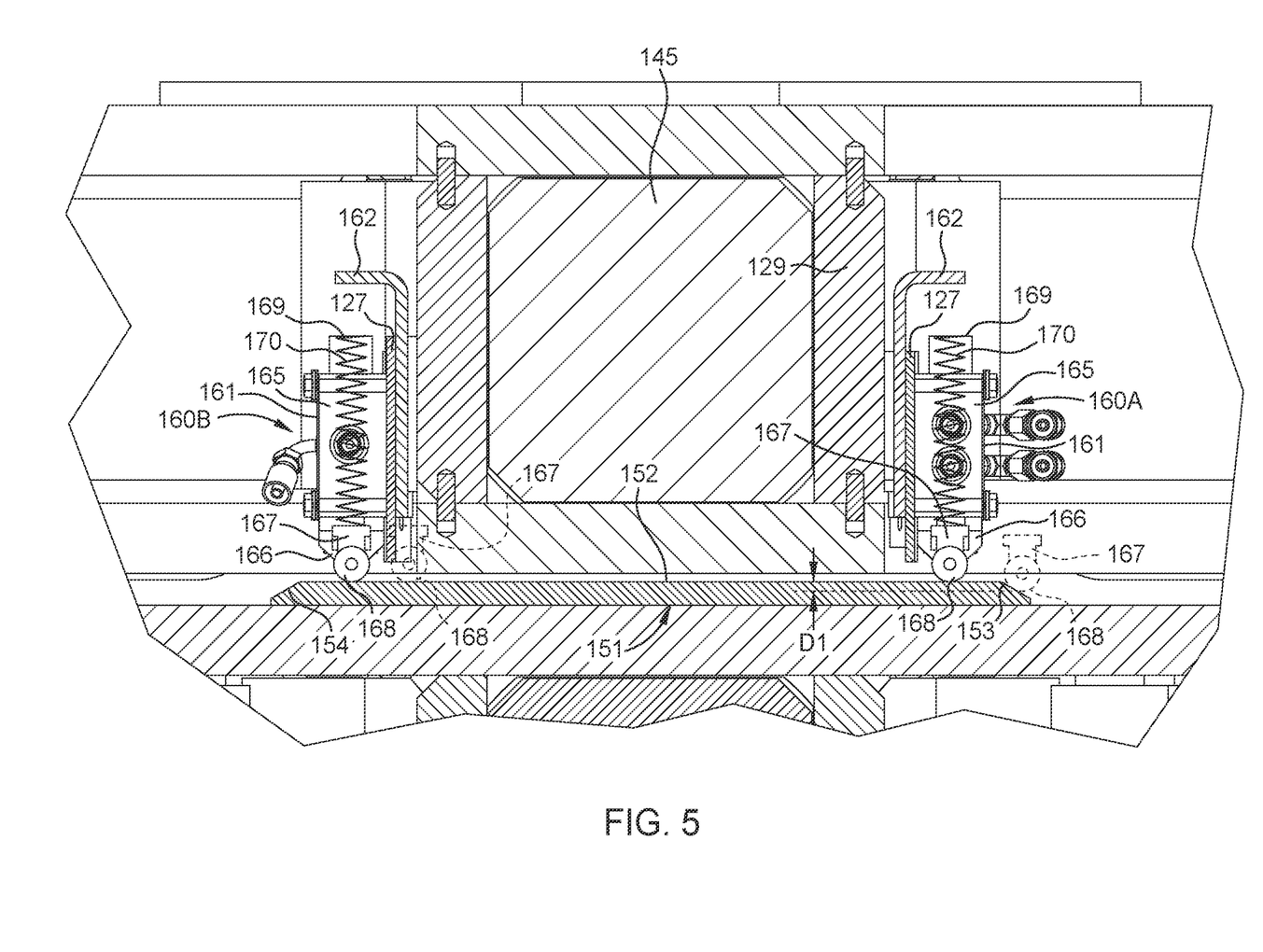
FIG. 5 is a schematic partial back cross-sectional view, along section 5-5 shown in FIG. 3, of the wrench tool and the positioning subsystem, according to one implementation.

FIG. 5 is a schematic partial back cross-sectional view, along Section 5-5 shown in FIG. 3, of the wrench tool and the positioning subsystem 155. Cross-sectional hatching is not shown in FIG. 5 on some items for visual clarity purposes.

Each of the one or more position sensors 160A, 160B includes the sensor housing 161 at least partially defining an inner chamber 165, and a cylinder housing 166 coupled to the sensor housing 161. Each of the one or more position sensors 160A, 160B includes a piston 167 disposed at least partially in the cylinder housing 166, and a roller 168 coupled to the piston 167 and configured to roll along at least one of the one or more sensor tracks 151. A head of the piston 167 is configured to interface with an inner shoulder of the cylinder housing 166. The piston 167 can move linearly relative to the cylinder housing 166. The roller 168 is coupled to the piston 167 such that the roller 168 linearly moves with the cylinder housing 166. The piston 167 interfaces with a hydraulic fluid in the inner chamber 165. Each of the one or more position sensors 160A, 160B includes a spring housing 169 and a spring 170 disposed between the spring housing 169 and the head of the piston 167. Vertical movement of the piston 167 compresses the spring 170, and the spring biases the piston 167 toward the one or more sensor tracks 151. Each of the one or more position sensors 160A, 160B is in fluid communication with one or more pressure sensors 173 (shown in FIG. 3) configured to measure a pressure change of the hydraulic fluid in the inner chamber 165. In one or more embodiments, a linear position of the piston 167 and the roller 168 for each position sensor 160A, 160B indicates the angular position (and the angular misalignment) discussed above. In one or more embodiments, the one or more pressure sensors 173 are mounted to a back side of the wrench tool 100. In one or more examples, the one or more pressure sensors 173 are mounted at least partially to one or more of the second plates 136, 137 of the upper clamp assembly 135. At least one conduit 164 of each of the one or more sensors 160A, 160B is fluidly connected to at least one of the one or more pressure sensors 173 such that that the one or more pressure sensors 173 can measure the pressure change in each inner chamber 165.

During rotation of the upper clamp assembly 135 relative to the lower clamp assembly 140, the rollers 168 of each position sensor 160A, 160B rolls along the plateau surface 152. Upon one of the rollers 168, rolling off of the plateau surface 152, the linear position of the roller 168 changes (e.g., the piston 167 and the roller 168 lower relative to the cylinder housing 166). A change in the linear position is shown for a ghost position of the roller 168 of the first position sensor 160A in FIG. 5. The change in the linear position of the roller 168 causes a pressure change of the hydraulic fluid in the inner chamber 165, and the pressure change can be detected (e.g., measured) by the one or more pressure sensors 173.

The one or more pressure sensors 173 can be part of a hydraulic logic manifold 195 (shown in FIG. 3). The hydraulic logic manifold 195 can be used in addition to or in place of the controller 190. The hydraulic logic manifold 195 includes a one or more valves 196A, 196B fluidly connected to the one or more position sensors 160A, 160B and/or the one or more pressure sensors 173. The one or more valves 196A, 196B are fluidly connected to the hydraulic cylinders 125 to power the hydraulic cylinders 125. In response to the pressure change detected by the one or more pressure sensors 173, the one or more valves 196A, 196B are used to stop, start, decrease, and/or increase a flow of hydraulic fluid to one of the hydraulic cylinders 125 relative to the other of the hydraulic cylinders 125 to realign the wrench tool 100 within the angular alignment range. The one or more pressure sensors 173 can each include one or more pressure switches that bias the one or more valves 196A 196B toward an open position or a closed position.

The hydraulic logic manifold 195 can function similarly to the controller 190. As an example, the hydraulic logic manifold 195 can be hydraulically and mechanically configured to control the operations of the various wrench tools and wrench systems described herein. The hydraulic logic manifold 195 can be hydraulically and mechanically configured in accordance with operational parameters (such as the angular alignment range) described herein. The hydraulic logic manifold 195 can be configured to conduct any of the operations described herein. The hydraulic logic manifold 195 can be configured to cause one or more of operations of method 900 (described below) to be conducted.

The various operations described herein (such as the operations of the method 900) can be conducted automatically using the hydraulic logic manifold 195, or can be conducted automatically and/or manually with certain operations conducted by a user.

The hydraulic logic manifold 195 is configured to control the wrench tool 100 based on hydraulic measurements measured using the one or more position sensors 160A, 160B and/or the one or more pressure sensors 173.

Using the controller 190, the supply of power (e.g., hydraulic fluid) to the hydraulic cylinders 125 can be controlled using electronic signals. Using the hydraulic logic manifold 125, the supply of power (e.g., hydraulic fluid) to the hydraulic cylinders 125 can be controlled using hydraulic signals.

FIG. 5 show an example implementation (in ghost) where the upper clamp assembly 135 has been pivoted in the counter-clockwise direction relative to the lower clamp assembly 140. The wrench system 101 can determine that the correction operation is needed upon one of the rollers 168 rolling off of the plateau surface 152. The wrench system 101 can also determine which direction is needed for the correction operation. The side corresponding to the position sensor 160A, 160B that is outside of the angular alignment range indicates the direction in which to pivot the upper clamp assembly 135 for the shortest correction. As an example, if the roller 168 of the first position sensor 160A (as opposed to the second position sensor 160B) rolls off of the plateau surface 152, then the wrench system 101 determines that the upper clamp assembly 135 is to be pivoted in the clockwise direction to correct for the angular misalignment.

In one or more embodiments, the wrench system 101 can determine that the correction operation (of pivoting) is needed after the linear position of one or more of the rollers 168 has changed by at least a threshold distance D1. The threshold distance D1 can correspond to a threshold pressure change detected by the one or more pressure sensors 173. In one or more embodiments, the threshold pressure change and/or the threshold distance D1 corresponds to an angular misalignment that is above the angular misalignment range.

During the correction operation, the upper clamp assembly 135 is pivoted relative to the lower clamp assembly 140 until the rollers 168 and the piston 167 are within a linear position range. The linear position range corresponds to the angular misalignment range.

Figure 6:
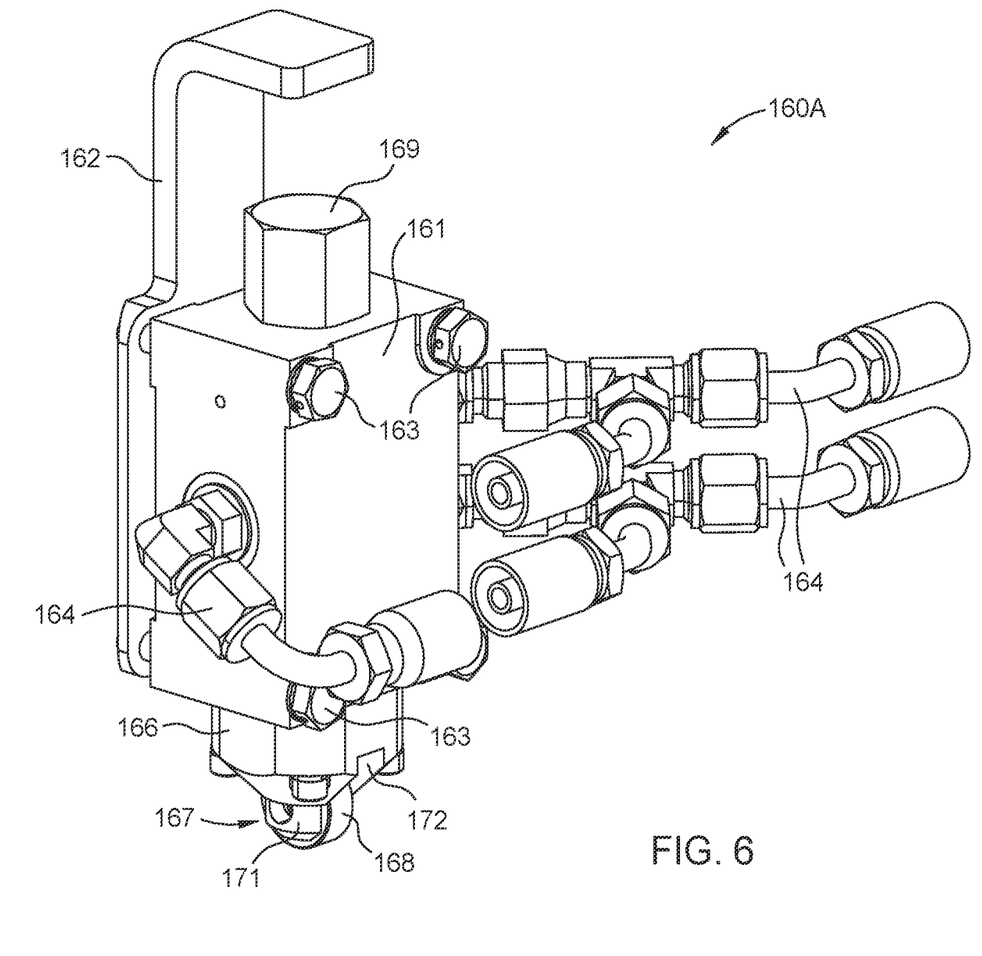
FIG. 6 is a schematic partial perspective view of a first side of a first position sensor shown in FIGS. 1-5, according to one implementation.

FIG. 6 is a schematic partial perspective view of a first side of the first position sensor 160A shown in FIGS. 1-5, according to one implementation.

Figure 7:
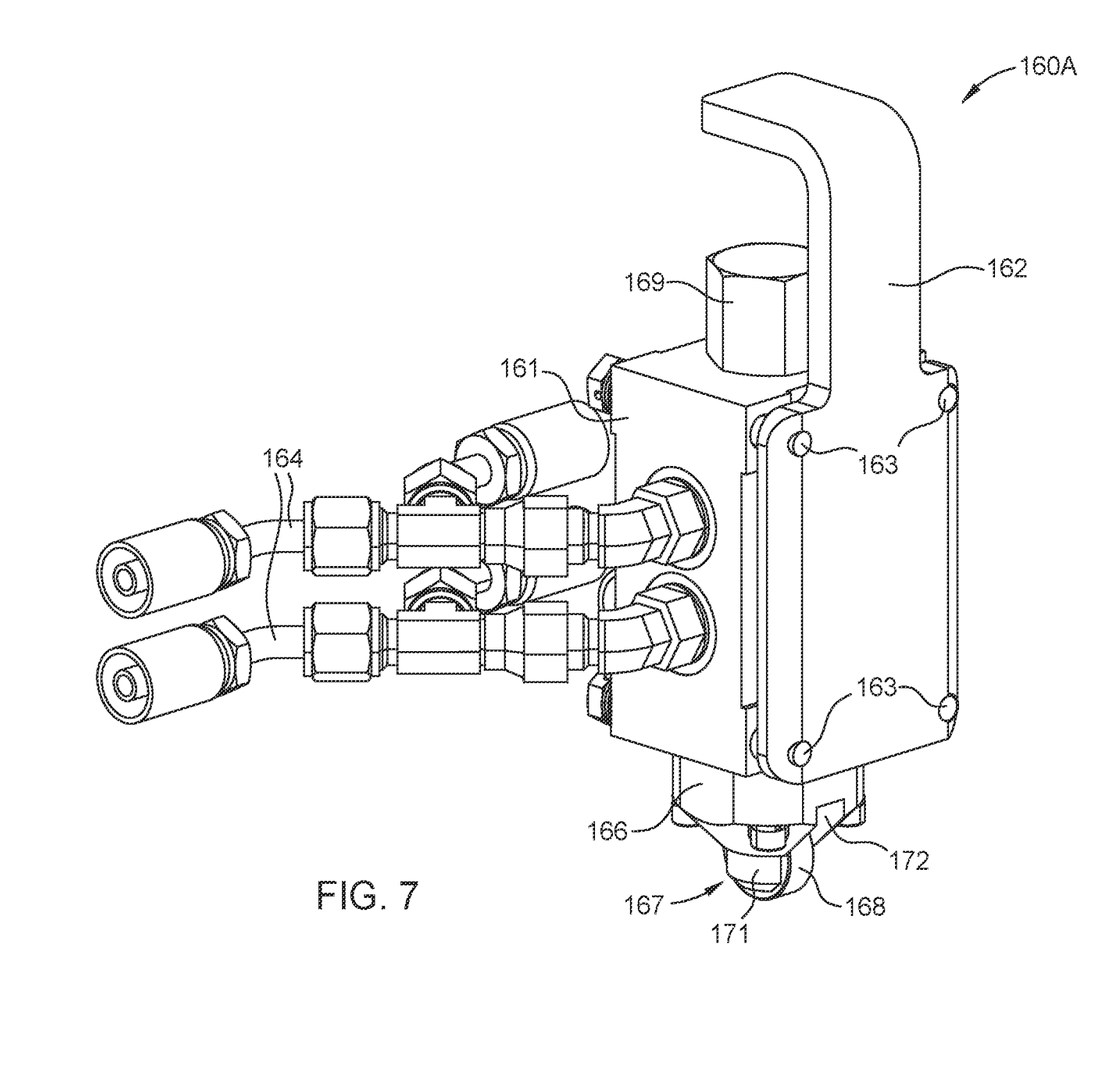
FIG. 7 is a schematic partial perspective view of a second side of the first position sensor shown in FIGS. 1-6, according to one implementation.

FIG. 7 is a schematic partial perspective view of a second side of the first position sensor 160A shown in FIGS. 1-6, according to one implementation.

Each roller 168 is cylindrical in shape (such as disc-shaped). Each roller 168 is positioned between two rod flanges 171 of the piston 167. A fastener is positioned through the rod flanges 171 and through the roller 168 to couple the roller 168 to the piston 167. The piston 167 and/or the roller 168 are positioned at least partially in a slot 172 formed in the cylinder housing 166.

Figure 8:
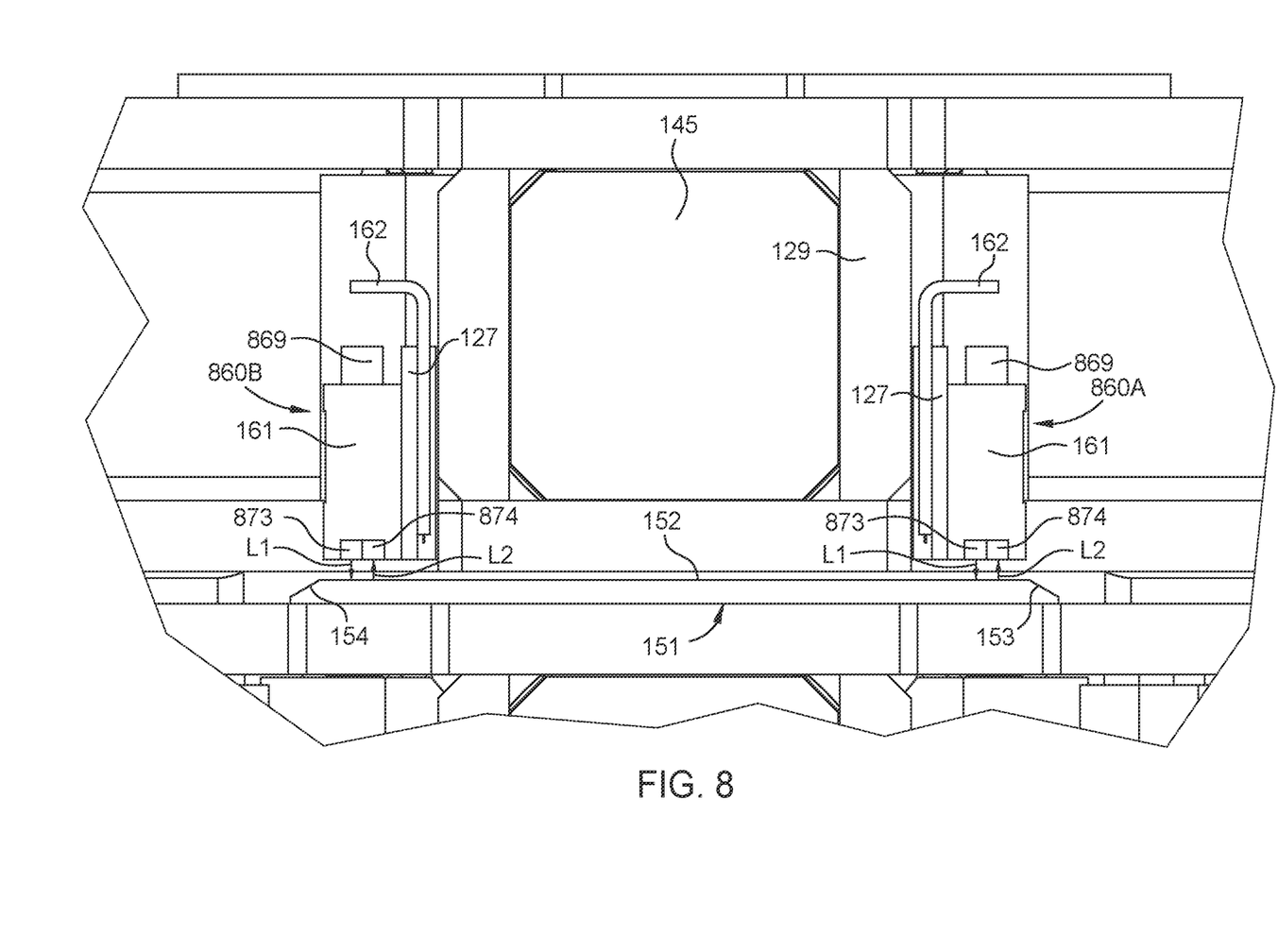
FIG. 8 is a schematic partial back view, along section 5-5 shown in FIG. 3, of the wrench tool and the positioning subsystem, according to one implementation.

FIG. 8 is a schematic partial back view, along Section 5-5 shown in FIG. 3, of the wrench tool 100 and the positioning subsystem 155, according to one implementation.

In the implementation shown in FIG. 8, one or more position sensors 860A, 860B (two are shown) are used in place of the one or more position sensors 160A, 160B. The position sensors 860A, 860B are electric. Each position sensor 860A, 860B includes a light emitter 873 configured to emit light L1 toward one of the one or more sensor tracks 151, and a light receiver 874 configured to receive light L2 reflected from the one of the one or more sensor tracks 151. Each position sensor 860A, 860B includes a detector 869 configured to measure a light intensity change of the light L2 reflected, relative to the light L1 emitted.

The present disclosure contemplates that the detector 869 can be configured to measure a light distance change (such as a change in the distance, corresponding to travel time, across which the light travels to reflect off of an object and back to the light receiver 874). The light intensity change and/or the light distance change occurs and is detected by the detector 869 when the respective light receiver 874 is misaligned from (e.g., pivoted away from) the plateau surface 152 of the one or more sensor tracks 151.

In one or more embodiments, the wrench system 101 can determine that the correction operation (of pivoting) is needed after the light intensity change and/or the light distance change has changed by at least a threshold intensity change and/or a threshold distance change. The threshold distance change can correspond to the threshold distance D1. In one or more embodiments, the threshold intensity change and/or the threshold distance change correspond to an angular misalignment that is above the angular misalignment range. During the correction operation, the upper clamp assembly 135 is pivoted relative to the lower clamp assembly 140 until the rollers 168 and the piston 167 are within a light intensity range and/or a light distance range. The light intensity range and/or the light distance range correspond to the angular misalignment range.

Figure 9:
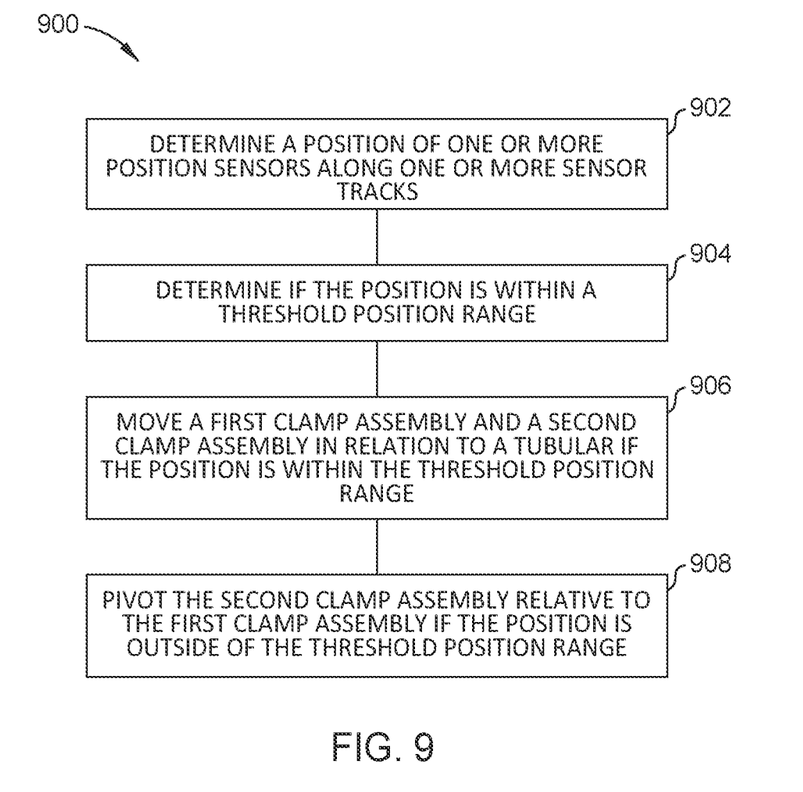
FIG. 9 is a schematic block diagram view of a method of adjusting a wrench, according to one implementation.

FIG. 9 is a schematic block diagram view of a method 900 of adjusting a wrench, according to one implementation.

Operation 902 includes determining a position of one or more position sensors along one or more sensor tracks. The one or more sensor tracks are mounted to a first clamp assembly and the one or more position sensors mounted to a second clamp assembly. In one or more embodiments, the determining of the position includes determining a linear position of a piston of each of the one or more position sensors. The linear position indicates an angular position of the second clamp assembly relative to the first clamp assembly. The linear position indicates the position of the one or more position sensors along the one or more sensor tracks.

Operation 904 includes determining if the position (such as the linear position) is within a threshold position range. The threshold position range corresponds to an angular misalignment range. In one or more embodiments, the angular misalignment range is 0 degrees to 10 degrees. Other ranges (such as 0 degrees to 15 degrees and/or 0 degrees to 20 degrees) can be used for the angular misalignment range. The angular misalignment range can depend, for example, on the size of the tubular and/or the sizes of the first and second throats.

The one or more position sensors interface with a plateau surface of the one or more sensor tracks if the linear position is within the threshold position range. The one or more position sensors interface with a first surface or a second surface (outwardly of the plateau surface) if the linear position is outside of the threshold position range.

Operation 906 includes moving the first clamp assembly and the second clamp assembly in relation to a tubular if the position (e.g., the linear position) is within the threshold position range. Both the first clamp assembly and the second clamp assembly are laterally moved to move the tubular into or out of a first throat of the first clamp assembly and a second throat of the second clamp assembly. As an example, the overall wrench tool 100 shown in FIG. 1 can be laterally moved. The first clamp assembly and the second clamp assembly can be laterally moved, raised, and/or lowered using a primary actuation system. The primary actuation system can couple to the hangers 120.

Operation 908 includes pivoting (e.g., rotating) the second clamp assembly relative to the first clamp assembly if the position (e.g., such as the linear position) is outside of the threshold position range. The second clamp assembly is pivoted relative to the first clamp assembly until the linear position is within the threshold position range if the linear position is outside of the threshold position range. In one or more embodiments, the pivoting is conducted using a secondary actuation system to align the first throat and the second throat with each other such that the tubular is not obstructed when the tubular passes into the first and second throats. The secondary actuation system can include the hydraulic cylinders 125.

In one or more embodiments, the one or more position sensors are continuously monitored (e.g., automatically monitored during operation of the wrench) to determine the position of the one or more position sensors along the one or more sensor tracks. For example, the operations 902-908 can be continuously conducted as needed during operation of the wrench.

Benefits of the present disclosure include reducing misalignment of wrench tools in a manner that is easy, simple, accurate, quick, and inexpensive; reduced or eliminated occurrence of collision; reduced or eliminated tool damage; reduced operational delays; and reduced costs. As an example, the hydraulic position sensors 160A, 160B facilitate correcting for misalignment while reducing costs of the wrench system 101. The hydraulic position sensors 160A, 160B facilitate reduced parts in the system, such as reduced or eliminated hazardous area electronics. The hydraulic position sensors 160A, 160B also facilitate accuracy by facilitating reduced or eliminated interference from environmental factors (such as environmental contaminations).

Correction operations using the present disclosure is not only preventative (e.g., by preventing collision) but also corrective (e.g., by automatically correcting for misalignments).

It is contemplated that one or more of the aspects disclosed herein may be combined. Moreover, it is contemplated that one or more of these aspects may include some or all of the aforementioned benefits. For example, the present disclosure contemplates that one or more aspects, features, components, operations, and/or properties of the wrench tool 100, the wrench system 101, the one or more position sensors 160A, 160B, the one or more position sensors 860A, 860B, and/or the method 900 may be combined.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The disclosure also contemplates that one or more aspects of the embodiments described herein may be substituted in for one or more of the other aspects described. The scope of the disclosure is determined by the claims that follow.

We claim:

1. A wrench system, comprising:
 a first clamp assembly;
 a second clamp assembly; and
 a positioning subsystem comprising:
  one or more sensor tracks mounted to the first clamp assembly, and
  one or more position sensors mounted to the second clamp assembly, the one or more position sensors configured to interface with the one or more sensor tracks to measure a rotated angular position of the second clamp assembly relative to the first clamp assembly.

2. The wrench system of claim 1, wherein the rotated angular position indicates a rotated angular misalignment between the second clamp assembly and the first clamp assembly.

3. The wrench system of claim 2, wherein:
 the first clamp assembly comprises a first plate, a first throat formed in the first plate, and a plurality of first grip assemblies mounted at least partially to the first plate; and
 the second clamp assembly comprises a second plate, a second throat formed in the second plate, and a plurality of second grip assemblies mounted at least partially to the second plate, wherein the rotated angular misalignment is between the second throat and the first throat.

4. The wrench system of claim 1, wherein the one or more position sensors comprise a first position sensor mounted to a first outward side of the second clamp assembly, and a second position sensor mounted to a second outward side of the second clamp assembly.

5. The wrench system of claim 4, wherein the one or more sensor tracks comprise a single sensor track configured to interface with both of the first position sensor and the second position sensor.

6. The wrench system of claim 5, wherein the single sensor track comprises:
 a plateau surface;
 a first surface on a first side of the plateau surface; and a second surface on a second side of the plateau surface, wherein each of the first surface and the second surface is tapered or arcuate.

7. The wrench system of claim 1, wherein each of the one or more position sensors comprises:
   a sensor housing at least partially defining an inner chamber;
   a cylinder housing coupled to the sensor housing;
   a piston disposed at least partially in the cylinder housing; and
   a roller coupled to the piston and configured to roll along at least one of the one or more sensor tracks.

8. The wrench system of claim 7, wherein a linear position of the piston and the roller indicates the rotated angular position.

9. The wrench system of claim 8, wherein the piston interfaces with a hydraulic fluid in the inner chamber, and the wrench system further comprises one or more pressure sensors configured to measure a pressure change of the hydraulic fluid in the inner chamber of each of the one or more position sensors.

10. The wrench system of claim 8, wherein the piston and the roller interface with a plateau surface of the sensor track if the linear position is within a threshold position range, and wherein the piston and the roller interface with a tapered or arcuate surface of the sensor track if the linear position is outside of the threshold position range.

11. The wrench system of claim 10, wherein the wrench system is configured to rotate the second clamp assembly relative to the first clamp assembly until the linear position is within the threshold position range if the linear position is outside of the threshold position range.

12. The wrench system of claim 1, wherein each of the one or more position sensors comprises:
   a light emitter configured to emit light toward one of the one or more sensor tracks;
   a light receiver configured to receive light reflected from the one of the one or more sensor tracks; and
   a detector configured to measure a light intensity change of the light reflected from the one of the one or more sensor tracks.

13. A wrench system, comprising:
   a first clamp assembly;
   a second clamp assembly;
   a sensor track coupled to the first clamp assembly; and
   a position sensor coupled to the second clamp assembly, wherein the position sensor interfaces with a plateau surface of the sensor track and a side surface adjacent to the plateau surface, wherein when the position sensor interfaces with the plateau surface, the second clamp assembly is in a first rotated angular position relative to the first clamp assembly, and wherein when the position sensor interfaces with the side surface, the second clamp assembly is in a second rotated angular position relative to the first clamp assembly, and wherein the second rotated angular position indicates a rotated angular misalignment between the second clamp assembly and the first clamp assembly.

14. The wrench system of claim 13, wherein:
   the first clamp assembly comprises a first plate, a first throat formed in the first plate, and a plurality of first grip assemblies mounted at least partially to the first plate; and
   the second clamp assembly comprises a second plate, a second throat formed in the second plate, and a plurality of second grip assemblies mounted at least partially to the second plate, wherein the rotated angular misalignment is between the second throat and the first throat.

15. The wrench system of claim 13, wherein the position sensor comprises a first position sensor mounted to a first outward side of the second clamp assembly, and a second position sensor mounted to a second outward side of the second clamp assembly.

16. The wrench system of claim 15, wherein the sensor track comprises a single sensor track configured to interface with both of the first position sensor and the second position sensor, and wherein the side surface of the sensor track comprises one or more tapered or arcuate side surfaces.

17. The wrench system of claim 13, wherein the position sensor comprises:
   a sensor housing at least partially defining an inner chamber;
   a cylinder housing coupled to the sensor housing;
   a piston disposed at least partially in the cylinder housing; and
   a roller coupled to the piston and configured to roll along the sensor track.

18. The wrench system of claim 17, wherein a first linear position of the piston and the roller corresponds to the first rotated angular position of the second clamp assembly, and wherein a second linear position of the piston and the roller corresponds to the second rotated angular position of the second clamp assembly.

19. The wrench system of claim 17, wherein the piston interfaces with a hydraulic fluid in the inner chamber, and the wrench system further comprises one or more pressure sensors configured to measure a pressure change of the hydraulic fluid in the inner chamber of the position sensor.

20. The wrench system of claim 13, wherein the position sensor comprises:
   a light emitter configured to emit light toward the sensor track;
   a light receiver configured to receive light reflected from the sensor track; and
   a detector configured to measure a light intensity change of the light reflected from the sensor track.

* * * * *